(12) United States Patent
Sunaga et al.

(10) Patent No.: US 7,697,848 B2
(45) Date of Patent: Apr. 13, 2010

(54) WIRELESS COMMUNICATION SYSTEM, WIRELESS TRANSMITTING APPARATUS, AND WIRELESS RECEIVING APPARATUS

(75) Inventors: Tohru Sunaga, Kanagawa (JP); Yasuyuki Irie, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 825 days.

(21) Appl. No.: 11/444,192

(22) Filed: May 30, 2006

(65) Prior Publication Data

US 2006/0269293 A1 Nov. 30, 2006

(30) Foreign Application Priority Data

May 30, 2005 (JP) ............................. 2005-158036

(51) Int. Cl.
*H04B 10/00* (2006.01)
(52) U.S. Cl. .................... 398/201; 398/182; 398/183; 398/184; 398/140; 398/152
(58) Field of Classification Search ................ 398/118, 398/152, 149, 151, 170, 169; 349/62; 359/485, 359/487, 488, 494, 497, 502
See application file for complete search history.

(56) References Cited

U.S. PATENT DOCUMENTS

| 3,721,965 | A | * | 3/1973 | Morgan-Voyce | ............. | 365/122 |
| 4,582,396 | A | * | 4/1986 | Bos et al. | ..................... | 349/180 |
| 4,583,825 | A | * | 4/1986 | Buzak | .......................... | 349/75 |
| 4,652,087 | A | * | 3/1987 | Bos et al. | ....................... | 349/34 |
| 5,638,203 | A | * | 6/1997 | Hasegawa et al. | ........... | 349/139 |
| 6,359,712 | B1 | * | 3/2002 | Kamitani | ..................... | 398/41 |
| 6,476,897 | B1 | * | 11/2002 | Watanabe et al. | ........... | 349/139 |
| 6,509,575 | B1 | * | 1/2003 | Nanni | .................... | 250/559.05 |
| 2002/0140835 | A1 | * | 10/2002 | Silverstein | .................. | 348/340 |
| 2004/0218933 | A1 | * | 11/2004 | Fludger et al. | .............. | 398/205 |
| 2005/0007305 | A1 | * | 1/2005 | Johansen et al. | ............... | 345/32 |
| 2005/0280806 | A1 | * | 12/2005 | Oomori et al. | ........... | 356/237.2 |

FOREIGN PATENT DOCUMENTS

| JP | 09-096780 | 4/1997 |
| JP | 2001-086095 | 3/2001 |
| JP | 2004-030734 | 1/2004 |
| JP | 2004-072365 | 3/2004 |

\* cited by examiner

*Primary Examiner*—Ken N Vanderpuye
*Assistant Examiner*—Tanya Ngo
(74) *Attorney, Agent, or Firm*—Hogan & Hartson LLP

(57) ABSTRACT

A wireless communication system, a wireless transmitting apparatus, and a wireless receiving apparatus which can be applied to all types of light sources and can be applied to a variety of fields, provided with a medium forming an information transmission source, a general light source made of for example a lamp or the sun or another natural light source or artificial light source, a wireless transmitting apparatus for making the polarization of the light from the light source uniform and controlling the polarization plane of an infrared ray, visible ray, UV ray, or other light (modulating the light in polarization) so as to superimpose other information invisible to the human eye on visual information due to general reflected light and transmitting the same as an optical wireless signal, and a wireless receiving apparatus for receiving the optical wireless signal transmitted from the wireless transmitting apparatus and able to determine a change in orientation of the polarization plane of the light as information of the signal.

2 Claims, 6 Drawing Sheets

WIRELESS COMMUNICATION SYSTEM, WIRELESS TRANSMITTING APPARATUS, AND WIRELESS RECEIVING APPARATUS

BACKGROUND OF THE INVENTION

1. Field of Invention

The present invention relates to a wireless communication system, a wireless transmitting apparatus, and a wireless receiving apparatus for optical communications by controlling the polarization planes of light.

2. Description of the Art

In the art, wireless communication technology utilizing light is known and applied to mobile phones and other information communication apparatuses.

As a specific example of wireless communication technology utilizing light, the technology of changing light intensity of infrared rays or the like to generate a pulse signal and utilizing this pulse signal to transmit and receive data, the technology of utilizing modulated light of an LED or laser diode and analyzing the intensity of the light on the reception side to acquire data, and other technologies are known (see for example Japanese Patent Publication (A) No. 2004-72365).

However, the wireless communication technology as disclosed in Japanese Patent Publication (A) No. 2004-72365 was limited to use of specific light sources, therefore the fields to which the wireless communication technology was applied were limited.

SUMMARY OF THE INVENTION

An object of the present invention is to provide a wireless communication system, a wireless transmitting apparatus, and a wireless receiving apparatus which can be applied to all types of light sources and can be applied to a variety of fields.

According to a first aspect of the present invention, there is provided a wireless communication system comprising a wireless transmitting apparatus and a wireless receiving apparatus, wherein the wireless transmitting apparatus includes a polarization plane limiting part transmitting only light of specific polarization planes among light from a medium serving as an information transmission source and a polarization plane changing part changing an angle of a polarization plane of the light of the specific polarization planes, and the wireless receiving apparatus includes a detecting part detecting the light of the specific polarization planes from the wireless transmitting apparatus and an information extracting part generating a signal in accordance with the change of angle of a polarization plane of the light based on the detection of the light of the specific polarization planes at the detecting part and extracting the information transmitted from the wireless transmitting apparatus based on the signal.

According to a second aspect of the present invention, there is provided a wireless transmitting apparatus provided with a polarization plane limiting part transmitting only light of specific polarization planes among light from a medium serving as an information transmission source and a polarization plane changing part changing an angle of a polarization plane of the light of the specific polarization planes.

According to a third aspect of the present invention, there is provided a wireless receiving apparatus provided with a detecting part detecting light obtained by superimposing information on a change of angle of a specific polarization plane transmitted from a wireless transmitting apparatus and an information extracting part generating a signal in accordance with a change of angle of a polarization plane of light based on the detection of light of specific polarization planes at the detecting part and extracting the information transmitted from the wireless transmitting apparatus based on the signal.

Preferably, the polarization plane limiting part include a polarization plate or a polarization filter, and the polarization plane changing part includes a liquid crystal device transmitting the light of the specific polarization planes from the polarization plane limiting part and a control device controlling the liquid crystal device so that an angle of a polarization plane of the light of the specific polarization planes can be changed in accordance with the transmitted information.

Preferably, the detecting part has a polarization plate or polarization filter transmitting only light of a specific polarization plane and a sensor detecting the light transmitted through this polarization plate or the polarization filter.

Preferably, the detecting part has a plurality of polarization plates or polarization filters transmitting polarization planes different from each other and a plurality of sensors individually provided in the plurality of polarization plates or polarization filters and detecting light transmitted through the polarization plates or polarization filters, and the information extracting part has a controlling part comparing intensities of lights detected at the plurality of sensors and eliminating the intensity of the amount of outer disturbance light.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Below, an embodiment of the present invention will be explained with reference to the drawings.

Figure 1:
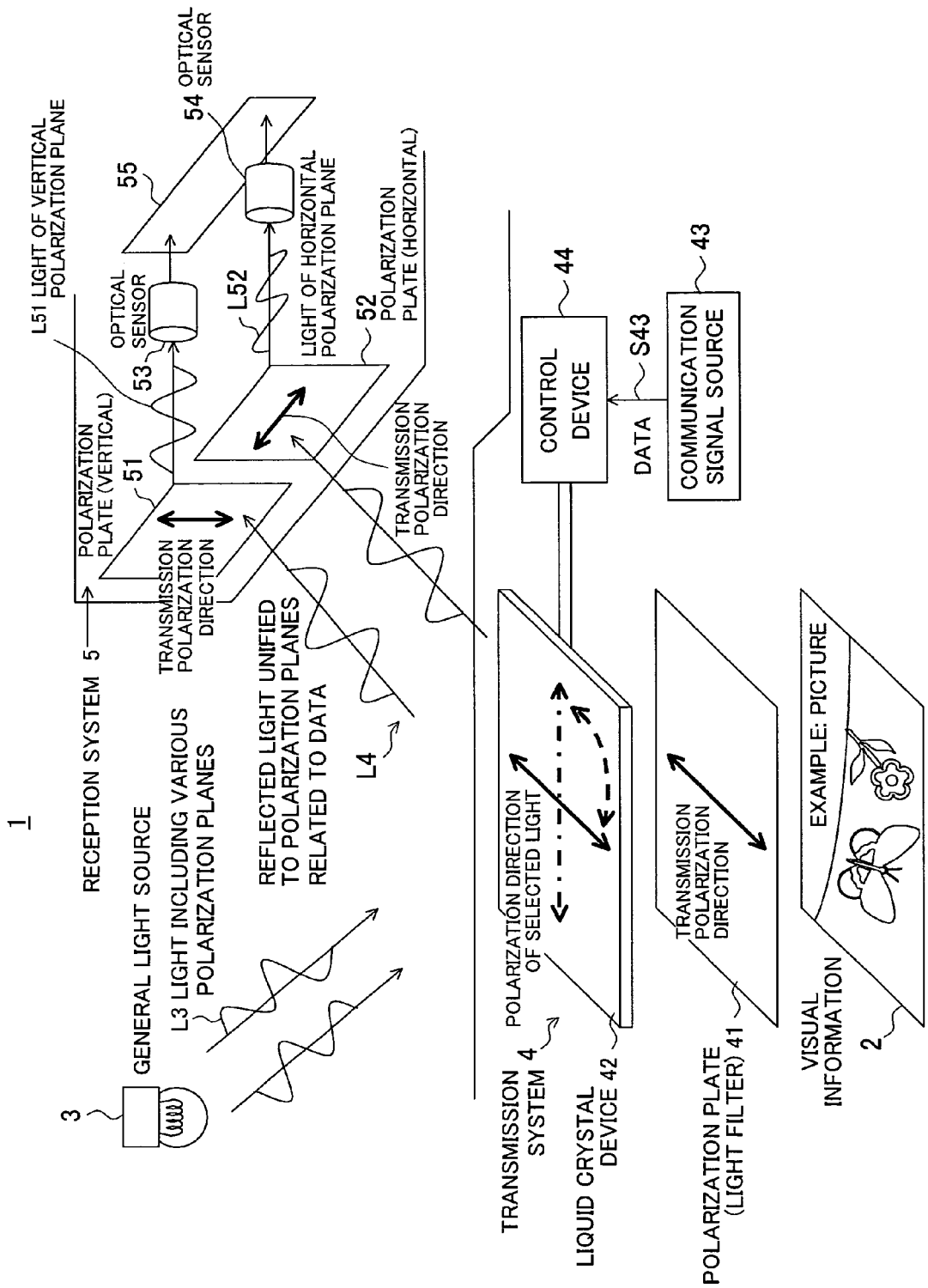
FIG. 1 is a diagram showing the fundamental configuration of a wireless communication system according to the present embodiment.

FIG. 1 is a diagram showing the fundamental configuration of a wireless communication system according to the present embodiment.

The wireless communication system 1 has a medium serving as an information transmission source (already existing visual information, exemplified as "picture" in the example of FIG. 1, the information of the medium 2 being called "visual information" in the following explanation) 2, a general light source 3 constituted by for example a lamp, the sun, or another natural light source or artificial light source, a wireless transmitting apparatus (transmission system) 4 for making the light from the light source 3 uniform in polarization and controlling the polarization plane of an infrared ray, visible light, UV ray, or other light (modulating the light in polarization) so as to superimpose other information invisible to the human eye on the visual information from general reflected light and transmitting the same as an optical wireless signal, and a wireless receiving apparatus 5 (reception system) receiving the optical wireless signal transmitted from the wireless transmitting apparatus 4 and able to determine the change in orientation of a polarization plane of the light as signal information.

The wireless transmitting apparatus 4 has a light filter (polarization plane limiting part) 41 arranged in the vicinity of the medium 2 as an information transmittion source and transmitting only light of specific polarization planes with respect to the light emitted from the medium 2, a liquid crystal device (polarization plane changing part) 42 changing a polarization plane of the light of the specific polarization planes specified at the light filter 41 in accordance with the transmitted visual information, a communication signal source 43 outputting an electromagnetic data signal, and a control device 44 for controlling the liquid crystal device 42 so as to change a polarization plane of the transmitted light in accordance with an electromagnetic data signal S43 from the communication signal source 43. The light filter 41 is constituted by for example a light polarization filter or a polarization plate and is illustrated as a polarization plate in the example of FIG. 1.

The arrangement and function of the wireless transmitting apparatus 4 will be explained next.

First, there is the medium 2 including already existing visual information ("PICTURE" in the example of FIG. 1). This medium 2 does not have a light source and gives visual information by reflecting light from an external general light source (artificial light of an electric lamp or a fluorescent lamp, natural light of the sun, moon, etc., or light passing through a medium scattering light by reflecting or transmitting it at or through the medium, or another light source emitting light not having unified polarization planes) 2.

In the vicinity of the medium 2 (above the medium 2 in FIG. 1), a light filter (polarization filter or polarization plate) 41 that transmits only specific polarization planes among all types of polarization planes included in the light from the light source 2 is arranged. The light filter 41 itself is laid on for example a screen surface of the liquid crystal device 42. In the vicinity of (in FIG. 1, above) the light filter 41, an element that electrically changes a polarization plane of the light, for example, a liquid crystal device (not a generally called liquid crystal display device, but a device not including a polarization plate and comprised of a liquid crystal sandwiched between conductive glass) 42 is arranged.

This liquid crystal device 42 is controlled by a control device 44 so as to change a polarization plane of the transmission light in accordance with the electromagnetic data signal S43 from the communication signal source 43. Namely, this liquid crystal device 42 functions as a device for freely changing the angle of the polarization plane of the reflected light limited to the specific polarization planes by the light filter 41, for example, the polarization plate. Due to this, other information (data) is superimposed on the already existing visual information from the reflected light (secondary light not by a light source) in a form that cannot be recognized by the human eye. In order to extract the superimposed information by the above configuration, use is made of an optical sensor provided with a polarization plate. The information is read by the wireless receiving apparatus 5 according to the intensity of the light received by the optical sensor and its change.

Here, the framework by which the wireless transmitting apparatus 4 of the present embodiment can modulate reflected light will be explained.

Figure 2:
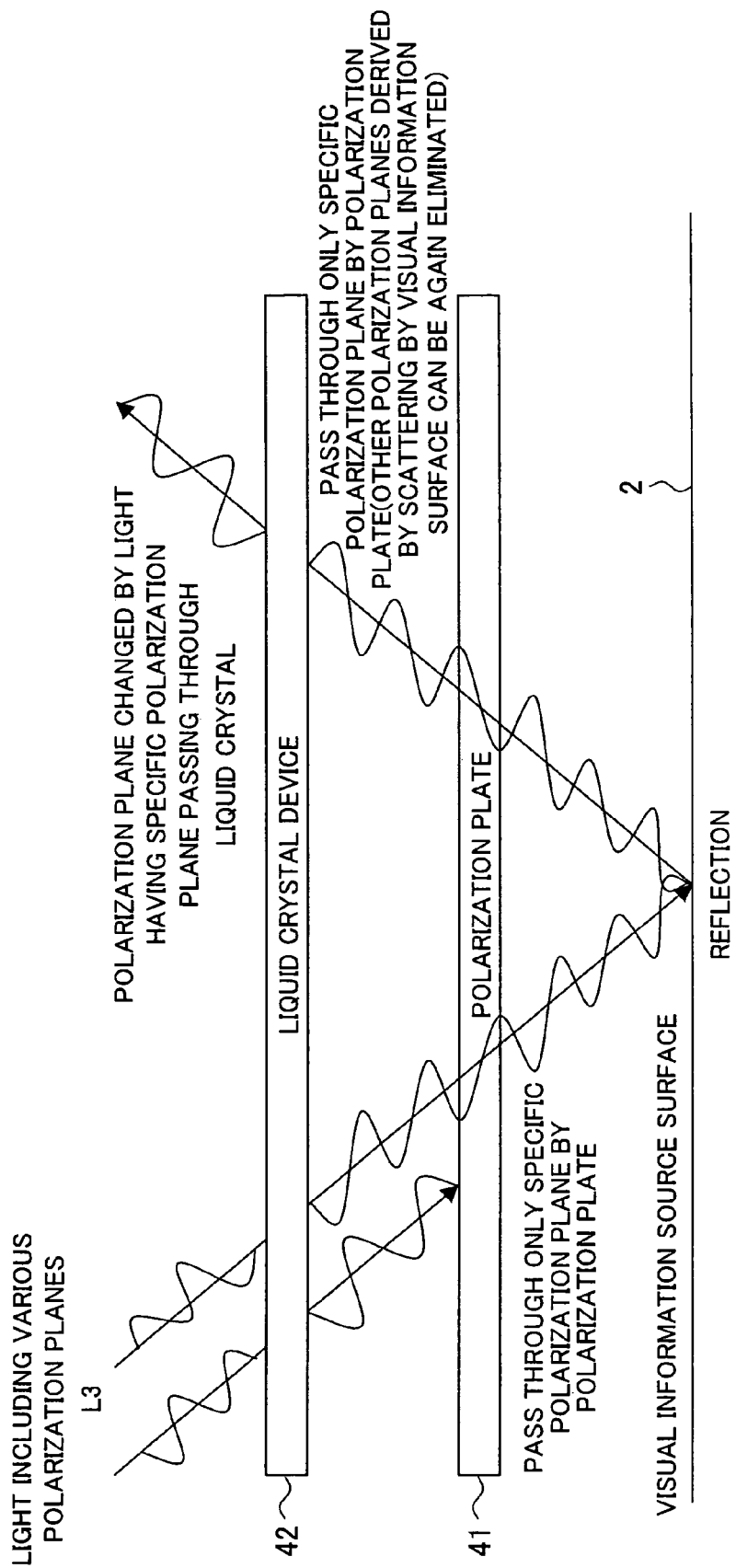
FIG. 2 is a diagram for explaining a framework by which a wireless transmitting apparatus of the present embodiment can modulate reflected light.

FIG. 2 is a diagram for explaining the framework by which the wireless transmitting apparatus 4 of the present embodiment can modulate reflected light. The light coming from the general light source 2 (left top in FIG. 2) includes a variety of polarization planes. When the light passes through the liquid crystal device 42, the light is modulated in polarization in accordance with the information controlling the liquid crystal device 42. Here, the "modulation in polarization" means just changing the rotation direction of the polarization plane at this stage. Namely, light having polarization planes of a variety of angles is passed through the liquid crystal to rotate the individual polarization planes. Note that at this point of time, the light still includes various (angles) of polarization planes. Then, when the above light reaches the polarization plate (light filter) 41, only light having a certain specific polarization plane will pass through it due to the polarization plate 41.

The transmitted light is reflected at the surface of the visual information source constituted by the medium 2. Only the light having a specific polarization plane among the reflected light passes through it again by the polarization plate 41. Note that where waves having different polarization planes are generated due to scattering when light is reflected at the surface of the visual information source constituted by the medium 2, these are eliminated at this point of time. The reflected light limited in polarization plane by the liquid crystal device 42 is modulated in polarization in accordance with the superimposed information (transmitted information). The "modulation in polarization" in this case means superposing information on the change (change in the rotation direction of the polarization plane) of the orientation (angle) of the polarization plane (does not mean superposing information on the amplitude and time axis phase of the light). Specifically, for example, this means deciding a polarization plane rotated 90 degrees as "0" and a polarization plane of an angle of 0 degree as "1" and, based on the change of combination of these "0" and "1", specifically calculating a signal "1" when changing from "0" to "1" or from "1" to "0" while calculating a signal "0" when "0" remains as it is or "1" remains as it is, and setting audio data or other information based on the combination of these calculated "0" and "1".

Next, the wireless receiving apparatus 5 of the present embodiment will be explained.

The wireless receiving apparatus 5 is provided with, as shown in FIG. 1, light filters (for example polarization plates) 51 and 52 for transmitting only light L4 of specific polarization planes transmitted from the wireless transmitting apparatus 4, optical sensors 53 and 54 for detecting light transmitted through the polarization plates 51 and 52, and an information extraction unit 55 for generating a signal in accordance with the change of the angle of the polarization plane based on the detection of the light of the specific polarization planes at the optical sensors 53 and 54 and extracting the information transmitted from the wireless transmitting apparatus 4 based on this signal. Further, the information extraction unit 55 eliminates the data of an outer disturbance component based on the light detected at a plurality of optical sensors 53 and 54.

Figure 3:
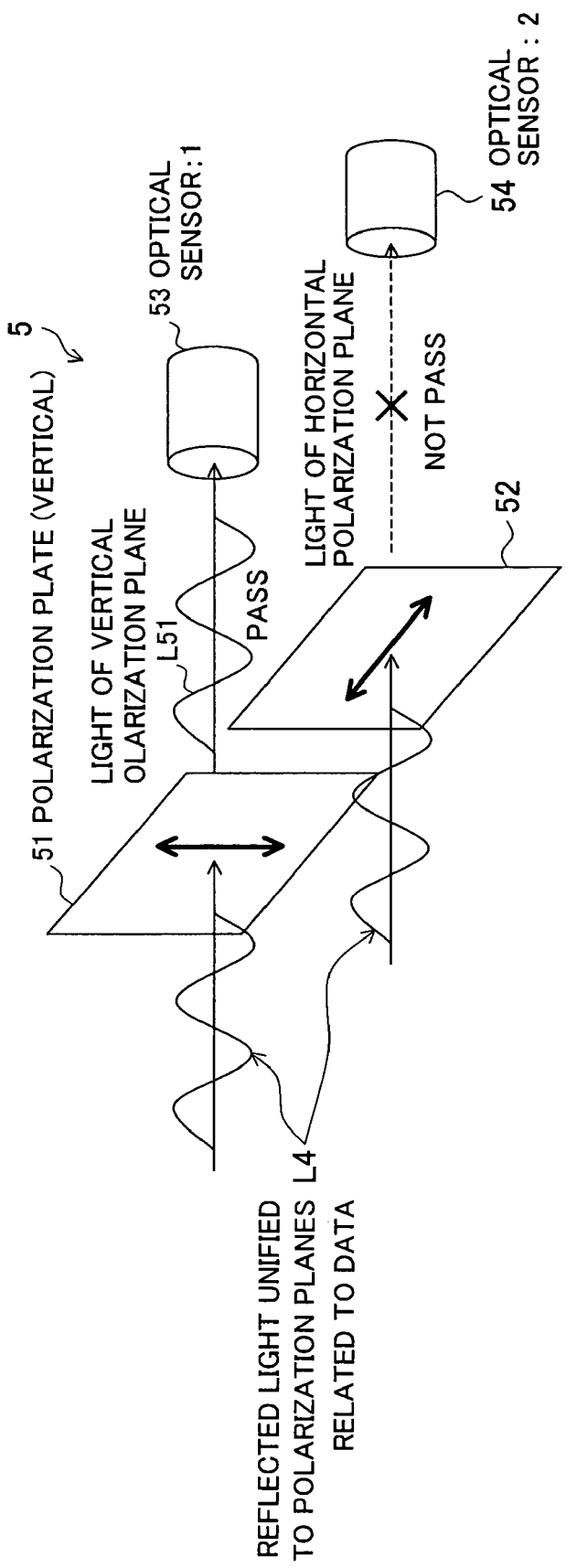
FIG. 3 is a diagram for explaining the framework of a wireless receiving apparatus of the present embodiment.

Here, the framework of the wireless receiving apparatus 5 of the present embodiment will be explained with reference to FIG. 3.

As explained above, the wireless receiving apparatus 5 of the present embodiment is provided with two polarization plates 51 and 52 and two optical sensors 53 and 54 for detecting the transmission lights L51 and L52 of the polarization plates 51 and 52. These components are arranged so that the polarization planes passing through the polarization plates 51 and 52 become perpendicular.

Note that, here, use is made of two polarization plates 51 and 52 and two optical sensors corresponding to these two polarization plates 51 and 52, but in the present invention, it is also possible to provide three or more polarization plates arranged so that the polarization planes passing through them are perpendicular and three or more optical sensors so as to correspond to these polarization plates. Due to this, even when the wireless receiving apparatus 5 moves etc., the light of a specific polarization plane from the wireless transmitting apparatus 4 can be reliably received.

Next, the tolerance with respect to disturbance light of the wireless receiving apparatus 5 of the present embodiment will be explained.

Figure 4:
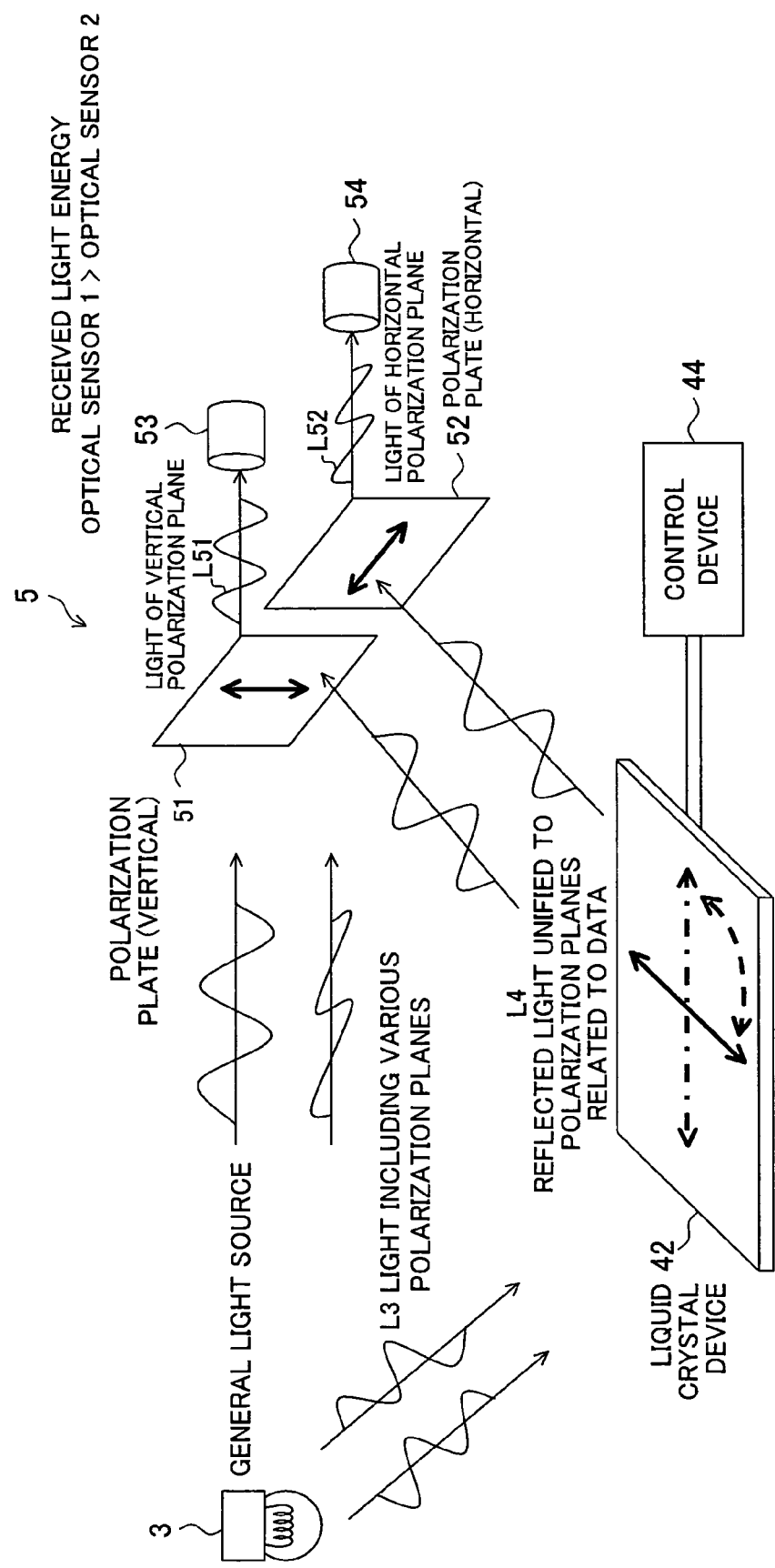
FIG. 4 is a diagram for explaining tolerance of the wireless receiving apparatus of the present embodiment against disturbance light.
Figure 5:
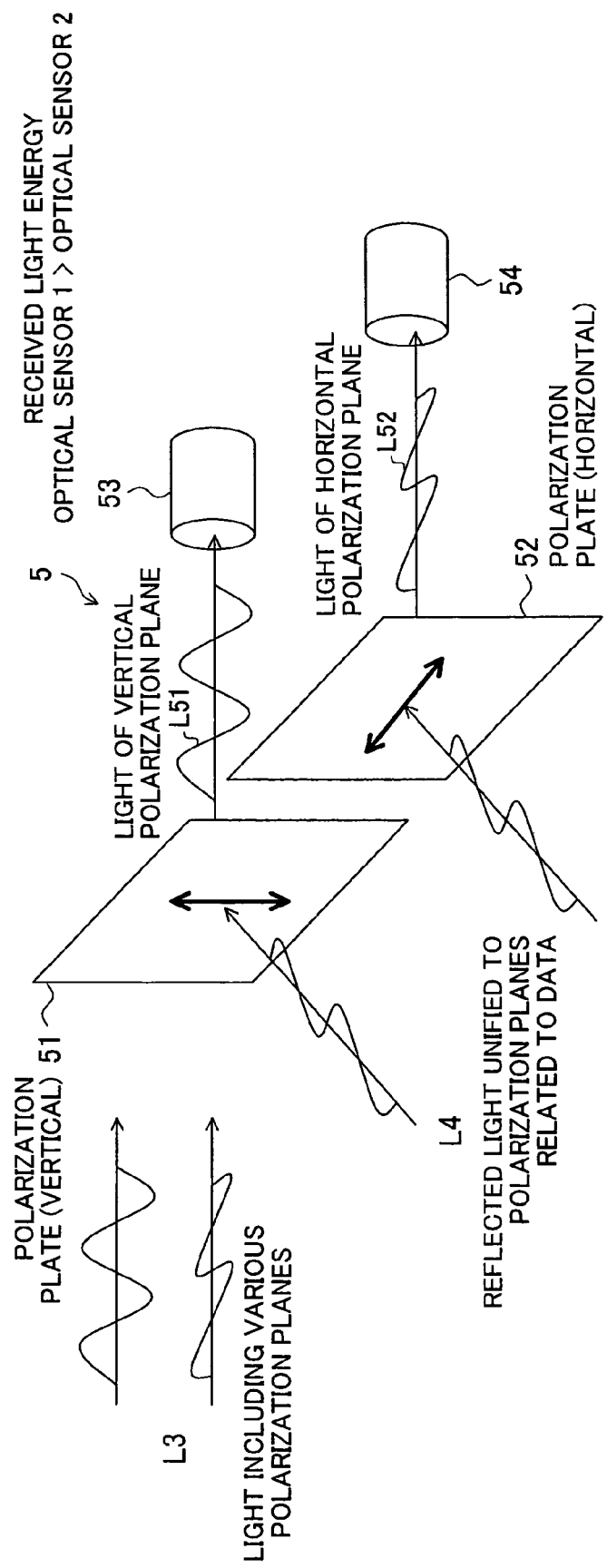
FIG. 5 is an example where a polarization plane is different from that in FIG. 4 by 90°.

FIG. 4 is a diagram for explaining the tolerance of the wireless receiving apparatus of the present embodiment with respect to disturbance light. FIG. 5 is an example where the polarization plane is different from that in FIG. 4 by 90°.

In the wireless receiving apparatus 5, other than the modulated wave, light emitted from general light sources or other scattering objects and not limited to specific polarization planes arrives. This light disturbs the modulated wave meant for communication. Part of this passes through the polarization plates 51 and 52 of the wireless receiving apparatus 5. General light sources uniformly include all types of polarization planes, therefore the intensities of the light received at the individual optical sensors 53 and 54 become substantially the same for the different light sources. The intensities of the light received at the optical sensors 53 and 54 become the intensities of the same value between sensors due to the disturbance light and intensities by the light on which the information is superimposed by the wireless transmitting apparatus 4. Accordingly, by utilizing the difference of intensities of the light obtained by the two sensors 53 and 54 for decoding (judgment) of the signal, the tolerance against light from a source other than the transmission system (wireless transmitting apparatus) which becomes the disturbance light (outer disturbance light) can be imparted.

Note that, in the present embodiment, use is made of two polarization plates 51 and 52 and two optical sensors so as to correspond to these two polarization plates 51 and 52, but in the present invention, as previously explained, by providing three or more polarization plates having polarization planes passing light perpendicular to each other and three or more sensors so as to correspond to these polarization plates, the intensity of the disturbance light can be detected with a high precision. Accordingly, calculation of a signal freer from the influence of the disturbance light becomes possible at the wireless receiving apparatus 5.

Note that, as a method for correctly receiving information even when the orientation of the wireless receiving apparatus (reception system) 5 with respect to the polarization planes of the light superimposed by the wireless transmitting apparatus (transmission system) 4 of the present embodiment is not fixed, use of a phase modulation system for superposing information on a phase change can be considered. Due to this, even in a method of use in which the orientation with respect to the polarization planes of the light from the transmission system changes, if the speed thereof can be handled by phase correction by the modulation method, this light can be received.

For example, when the data "0" is assigned in a case where the reception intensity of the optical sensor 53 is larger than the reception intensity of the optical sensor 54 (sensor 53>sensor 54) and the data "1" is assigned in a case where the reception intensity of the optical sensor 53 is smaller than the reception intensity of the optical sensor 54 (sensor 53<sensor 54), if the orientation of the reception system is inclined by 90° while maintaining an incident plane as it is, the relationships of "0" and "1" are switched. Therefore, the mechanism of determining the orientation with respect to a transmitter becomes necessary. As opposed to this, if the change of a polarization plane is treated as information, when the data changes from 0 to 1 or from 1 to 0, the data can be treated as "1", while when 0 or 1 is maintained, the data can be treated as "0", therefore, the information can be transmitted by PCM (Pulse Code Modulation).

Note that the reason for limitation to light of specific polarization planes in the present invention is as follows. If polarization planes of all directions are included in light sent by the wireless transmitting apparatus 4, the change does not appear in the intensity of the light after passing through the polarization filter, therefore the light may no longer can be recognized as the information.

Further, in the present invention, both of the transmission system and the reception system were constituted so as to handle specific polarization planes by using polarization plates, therefore, by limiting the instantaneous polarization planes of the light to be handled for both transmission and reception, discrimination from a light source including all types of polarization planes in which the polarization planes are not unified is enabled. Further, by further providing a liquid crystal device in the transmission system, it becomes possible to superimpose information on the light which can be discriminated as described above.

Further, it is also possible not to use a liquid crystal, but to rotate the polarization plate and thereby to make the polarization plane variable. The present embodiment is constituted so that the medium 2 does not emit light, but natural light etc. is reflected at the medium 2, but the present invention is not limited to this. A configuration making the medium per se emit light can also be employed.

In the present embodiment, a specific polarization plane is provided for light heading toward the outside (without regard as to if the light is reflected light or direct light), therefore, by making the specific polarization plane variable (controlling the rotation), predetermined information is transmitted. At the same time, the reception side recognizes the change of the polarization plane of the light of such a specific polarization plane (presence/absence of the received light) to thereby extract information (data).

Figure 6:
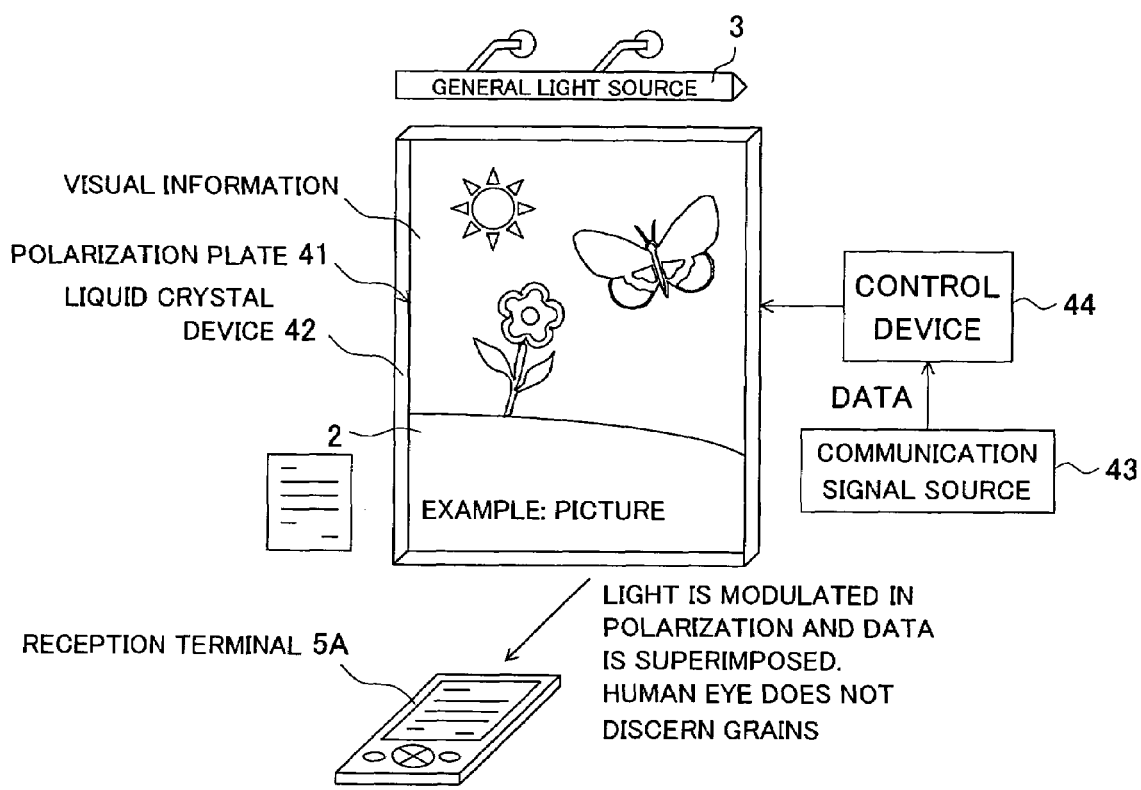
FIG. 6 is a diagram showing an actual image of use using the hardware configuration of FIG. 1.

FIG. 6 is a diagram showing an actual image of use using the hardware configuration of FIG. 1.

In FIG. 6, the wireless transmitting apparatus 4 is attached to a picture or other visual information source not emitting light. This is illuminated by a general light source 3 from above that. A viewer of the picture has a personal digital assistant 5A provided with the wireless receiving apparatus 5 and can obtain superimposed information of the picture (for example, the artist, an explanation, etc.) by turning the reception unit of the personal digital assistant to the picture to be viewed. At this time, the general light source does not have to be specially changed or otherwise designed. Further, a person cannot discern light having different polarization planes, therefore the superimposed information does not adversely affect the original visual information.

As explained above, according to the present embodiment, since provision is made of a medium 2 forming the information transmission source, a general light source 3 comprised of for example a lamp or the sun or another natural light source or artificial light source, a wireless transmitting apparatus 4 for making the polarization of the light from the light source 3 uniform and controlling the polarization plane of an infrared ray, visible ray, UV ray, or other light (modulating it in polarization) and thereby superimposing other information invisible to the human eye on the visual information from the general reflected light and transmitting the same as an optical wireless signal, and a wireless receiving apparatus 5 for receiving the optical wireless signal transmitted from the wireless transmitting apparatus 4 and able to determine the change in the orientation of the light as the information of the signal, the following effects can be obtained.

Existing, general visible information, for example, an advertisement on the wall, the visual texture of a pebble floor etc., scenery seen from a window, or other information which can be read only by specific hardware while maintaining human visibility, can be added to light as information. At that time, blinking, attenuation, change of color, etc. are not caused, therefore an unpleasant feeling will not be given. The additional information can be superimposed on the existing visual information by just attaching the present device. In addition, the information does not exert any remarkable influence upon the original visual information. According to the present embodiment, the field of visible ray communication can be spread to media not emitting the light by itself. Namely, the present invention can also be applied to media which must not form a light source (floor, wall, etc.) and locations where direct light sources cannot be seen (indirect lighting) etc. The present invention can be applied to an environment in which a large output light source in which the control of brightness etc. is difficult (for example, a high pressure mercury lamp) is used. Existing light sources (visual information sources) can be utilized without any special change.

Summarizing the effect of the present invention, according to the present invention, a wireless communication system, a wireless transmitting apparatus, and a wireless receiving apparatus which can be applied to all types of light sources and can be applied to a variety of fields can be provided.

It should be understood by those skilled in the art that various modifications, combinations, sub-combinations and alterations may occur depending on design requirements and other factors insofar as they are within the scope of the appended claims or the equivalents thereof.

The invention claimed is:

1. A wireless communication system comprising a wireless transmitting apparatus and a wireless receiving apparatus, wherein the wireless transmitting apparatus includes a polarization plane limiting part transmitting only light of a specific polarization plane a reflection medium reflecting the light transmitted through the polarization plane limiting part, and a polarization plane changing part changing an angle of a polarization plane of the light, again transmitted through the polarization plane limiting part, among the light reflected at the reflection medium, and the wireless receiving apparatus includes a detecting part detecting the light of the specific polarization planes from the wireless transmitting apparatus and an information extracting part generating a signal in accordance with the change of angle of a polarization plane of the light based on the detection of the light of the specific polarization planes at the detecting part and extracting the information transmitted from the wireless transmitting apparatus based on the signal, wherein the polarization plane limiting part is constituted by a polarization plate or a polarization filter, and the polarization plane changing part includes a liquid crystal device transmitting the light of the specific polarization planes from the polarization plane limiting part and a control device controlling the liquid crystal device so that an angle of a polarization plane of the light of the specific polarization planes can be changed in accordance with the transmitted information.

2. A wireless transmitting apparatus comprising:

a polarization plane limiting part transmitting only light of a specific polarization plane a reflection medium reflecting the light transmitted through the polarization plane limiting part, and a polarization plane changing part changing an angle of a polarization plane of the light again transmitted through the polarization plane limiting part, among the light reflected at the reflection medium, wherein the polarization plane limiting part includes a polarization plate or a polarization filter, and the polarization plane changing part a liquid crystal device transmitting the light of the specific polarization planes from the polarization plane limiting part and a control device controlling the liquid crystal device so that an angle of a polarization plane of the light of the specific polarization planes can be changed in accordance with the transmitted information.

* * * * *